UNITED STATES PATENT OFFICE.

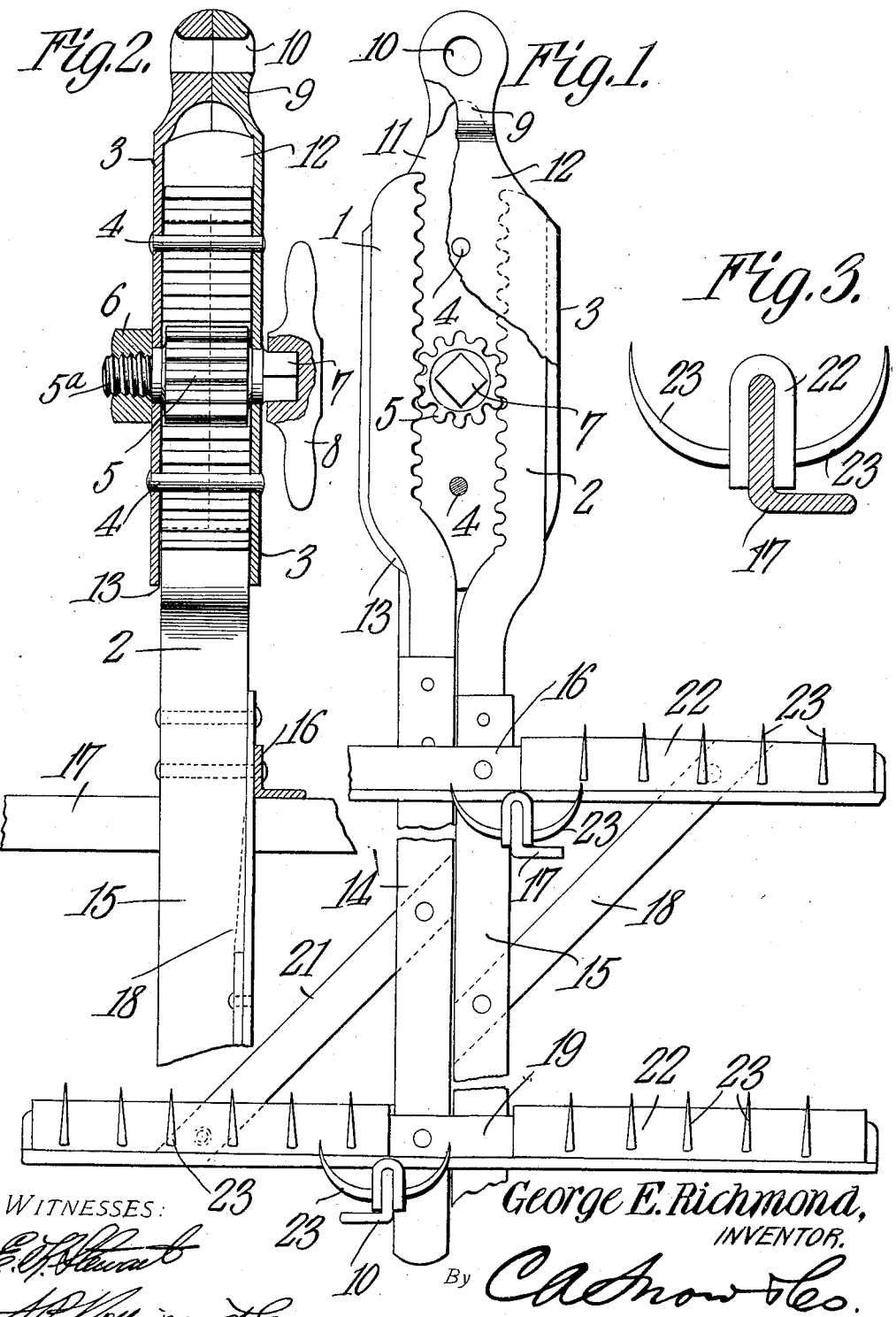

GEORGE E. RICHMOND, OF HOUSTON, TEXAS, ASSIGNOR OF ONE-HALF TO FRANK BROWN WEEKS, OF HOUSTON, TEXAS.

MEAT-TREE.

No. 897,015.  Specification of Letters Patent.  Patented Aug. 25, 1908.

Application filed April 29, 1907. Serial No. 370,942.

*To all whom it may concern:*

Be it known that I, GEORGE E. RICHMOND, a citizen of the United States, residing at Houston, in the county of Harris and State of Texas, have invented a new and useful Meat-Tree, of which the following is a specification.

This invention relates to a hanging support for meats to be smoked or subjected to cold storage, and is designed for use in carrying a number of pieces of meat to, and supporting them within, their place of storage.

The object of the invention is to provide a novel support or meat tree of simple form and strong construction, capable of holding a great many pieces of meat in two or more groups in different horizontal planes, and means for increasing the distance between the several groups to correspond to the length of the pieces of meat in each group.

In the accompanying drawing: Figure 1 is an elevation of the improved meat tree partly broken away. Fig. 2 is a vertical central sectional view of Fig. 1. Fig. 3 is a detail view.

Similar numerals of reference indicate the same part on all the figures.

As represented in the drawing, the invention consists broadly of two independent hangers, each provided with meat supports attached thereto in such manner as to form two independent groups.

Referring by numerals to the several parts, 1 and 2 indicate two rack bars, vertically disposed, inclosed within a two part housing or guide 3, joined together by rivets 4 extending laterally through the housing. The rack bars 1 and 2 are in the same plane and their gear teeth, which face each other, are engaged by an intermediate pinion 5 having horizontal journals, rotatable in bearings in the center of the housing sides 3. The journal on one side of the pinion has a reduced, threaded stem 5ª provided with a nut 6 on the outside of the housing. The opposite journal has a projecting polygonally shaped stud 7 on which a wrench or key 8 is placed when it is desired to rotate the pinion.

The housing 3, as heretofore stated, is made in two parts or halves, divided centrally in a plane passing through the two bars 1 and 2. At the top 9 the two parts of the housing are brought together and have a common opening 10 therethrough by means of which the tree is suspended. Openings 11 and 12 are made near the upper end of the housing 3 through which the upper ends of the respective rack bars 1 and 2 may emerge. The entire bottom 13 of said housing is open for the lower ends of said rack bars.

The rack bars 1 and 2 are brought into close relation at their lower ends and have bolted to them respectively, the downwardly extending or longitudinal angle bars 14 and 15. Also bolted to the vertical angle bar 2, near its upper end are two horizontal or transverse angle bars 16 and 17 which are placed at a right angle to each other and each extends equally on opposite sides of said vertical angle bars 1 and 2, the horizontal bar 16 being above the other horizontal bar 17. A brace 18 extends from each horizontal angle bar to the vertical angle bar to strengthen it and hold it in a rigid position. A similar arrangement is found on the vertical angle bar 1, but on a lower plane, where it will be seen from an inspection of Fig. 1 that the horizontal bars are numbered 19 and 20 and the brace 21. The horizontal bars on the vertical bar 2 form one group. The second group comprises the horizontal bars attached to the other vertical bar 1.

For the purpose of suspending pieces of meat on the tree, plates of sheet metal are folded to form U-shaped hangers 22 which easily fit over the standing edges of the horizontal bars, and have attached to their lower edges on each side, curved hooks 23 on which pieces of meat are hung. The hooks are separated from each other sufficiently far to prevent the hanging pieces of meat from coming into contact.

The meat tree being suspended from the opening 10, a hanger 22 is placed on the projecting portions of the horizontal angle bars and, if necessary, the pinion 5 is rotated to separate or bring closer together the two groups of bars and their hangers, the distance being regulated by the length of the pieces of meat to be suspended from the upper group. After the tree has been filled with meat, it is removed by suitable means to its destination.

Importance is attached to the use of the U-shaped hangers 22 because it becomes possible to place a number of pieces of meat upon one of these hangers and to carry the hanger to the rack and place it on one of the upper arms designed to support it. The operation of placing the meat upon the rack or tree is therefore greatly facilitated. Moreover, as the hangers are removable the hooks can be conveniently cleaned.

Having thus described the invention, what is claimed is:—

1. A meat tree comprising a supporting guide or housing, members movably mounted therein, groups of suspending devices connected to said members, and means coöperating with said members for simultaneously shifting the groups toward or from each other.

2. A meat tree comprising a guide, rack bars within the guide, bars at right angles to each other attached to each rack bar and forming a group, and a pinion between and engaging said rack bars for changing the vertical distance between said groups of bars.

3. A meat tree comprising a guide, slidable members within the guide, a group of supporting bars attached to each member, said groups being in different horizontal planes, and means coöperating with the slidable members for simultaneously moving said groups in opposite directions vertically.

4. A meat tree comprising a guide, parallel rack bars in the guide, a longitudinal bar extending from each rack bar, bars at a right angle to each other and perpendicular to each longitudinal bar and forming groups, said groups being in different parallel planes, and a pinion adapted to operate said rack bars simultaneously in opposite directions.

5. A meat tree comprising a supporting guide or housing, superposed groups of bars within the guide, means coöperating with the bars for simultaneously shifting each group to vary the distance between said groups, and a hanger provided with a plurality of hooks and removably supported on one of said bars.

In testimony that I claim the foregoing as my own, I have hereto affixed my signature in the presence of two witnesses.

GEORGE E. RICHMOND.

Witnesses:
J. T. GIBBONS,
J. H. WIGZELL.